United States Patent [19]

Coleman

[11] Patent Number: 4,689,100

[45] Date of Patent: Aug. 25, 1987

[54] PLANT TAG

[75] Inventor: John C. Coleman, Duncanville, Tex.

[73] Assignee: Horticultural Printers, Inc., Dallas, Tex.

[21] Appl. No.: 773,989

[22] Filed: Sep. 9, 1985

[51] Int. Cl.[4] .......................... B29C 65/08; B65C 7/00

[52] U.S. Cl. .................................. 156/73.1; 156/73.2; 156/252; 156/513; 156/568; 156/580.1; 156/DIG. 23; 493/375

[58] Field of Search ...................... 156/73.1, 73.2, 252, 156/513, 580.1, 568, DIG. 23; 493/375, 376; 40/2 R, 10 C, 21 R; 24/30.5 T

[56] References Cited

U.S. PATENT DOCUMENTS

| | | | |
|---|---|---|---|
| 844,998 | 2/1907 | Englert | 493/375 |
| 1,178,932 | 4/1916 | McGrath | 493/375 |
| 2,451,355 | 10/1948 | Pecker | 493/375 |
| 4,407,082 | 10/1983 | Stehouwer | 40/10 C |
| 4,578,139 | 3/1986 | Stehouwer | 156/580.1 |

*Primary Examiner*—Michael Wityshyn
*Attorney, Agent, or Firm*—Richards, Harris, Medlock & Andrews

[57] ABSTRACT

A plant tag (10) is disclosed which includes a tag card (12) and a tie (14). A hole (16) is formed in the tag card (12) near one edge thereof. The tie (14) is then passed through the hole and bent double. The tie portions are ultrasonically welded together near the edge of the tag card (12) to maintain the tie on the tag card.

2 Claims, 5 Drawing Figures

PLANT TAG

TECHNICAL FIELD

The present invention relates to the horticultural industry, and in particular to an improved tag for marking plants.

BACKGROUND OF THE INVENTION

The horticultural and nursery industry represents a large and growing portion of the economy. The industry encompasses a wide variety of operations, including commercial nurseries providing tree seedlings for fruit or wood pulp production and operations catering to individuals who enjoy planting and caring for various shrubs and plants at home.

In most facets of this industry, it is common to identify the particular plant or seedling by a nursery or plant tag. This tag will generally include some written indicia, including the identity of the plant or seedling, some description of the plant or seedling and instructions on the care thereof. The plant tag should be easy to attach on the plant to reduce labor costs, should be mounted on the plant so that the indicia can be readily seen by the potential purchaser, should not injure the plant and yet be secured to the plant so that it will not come off unintentionally under the influence of wind, rain and other environmental factors.

Several plant tag designs have been developed. One example of such a tag is disclosed in U.S. Pat. No. 4,407,082, issued on Oct. 4, 1983 to William J. Stehouwer. However, the industry continues to search for improved tags. However, none of the prior plant tags has proven fully satisfactory. Therefore, a need exists to develop a plant tag which has the advantages noted above and can be made inexpensively with readily available materials.

SUMMARY OF THE INVENTION

In accordance with one aspect of the present invention, a plant tag is provided which includes a tag card for carrying indicia thereon. The tag card has a hole formed therethrough proximate an edge of the tag card. A tie extends through the hole in the tag card and is folded double at the hole to form two parallel tie portions extending from the edge of the tag card. The two parallel tie portions are ultrasonically welded together proximate the edge of the tag card to secure the tie on the tag card.

In accordance with another aspect of the present invention, the tie is formed of at least one flexible wire core imbedded in a resilient material.

In accordance with another aspect of the present invention, a method is provided for forming a plant tag. The method includes the steps of indexing a tag card sequentially between first, second and third positions. The method includes a step of punching a hole in the tag card proximate an edge of the tag card at the first position. Further steps include threading a tie part way through the hole in the tag card and folding the tie double proximate the hole to form two parallel tie portions extending from the edge at the second position. Finally, the method includes the step of ultrasonically bonding the parallel tie portions together proximate the edge of the tag card in the third position to secure the tie to the tag card.

BRIEF DESCRIPTION OF THE DRAWINGS

A more complete understanding of the invention and its advantages will be apparent from the following Detailed Description when taken in conjunction with the accompanying Drawings, in which.

DETAILED DESCRIPTION

Figures 1, 2A, 2B, 2C, 3:
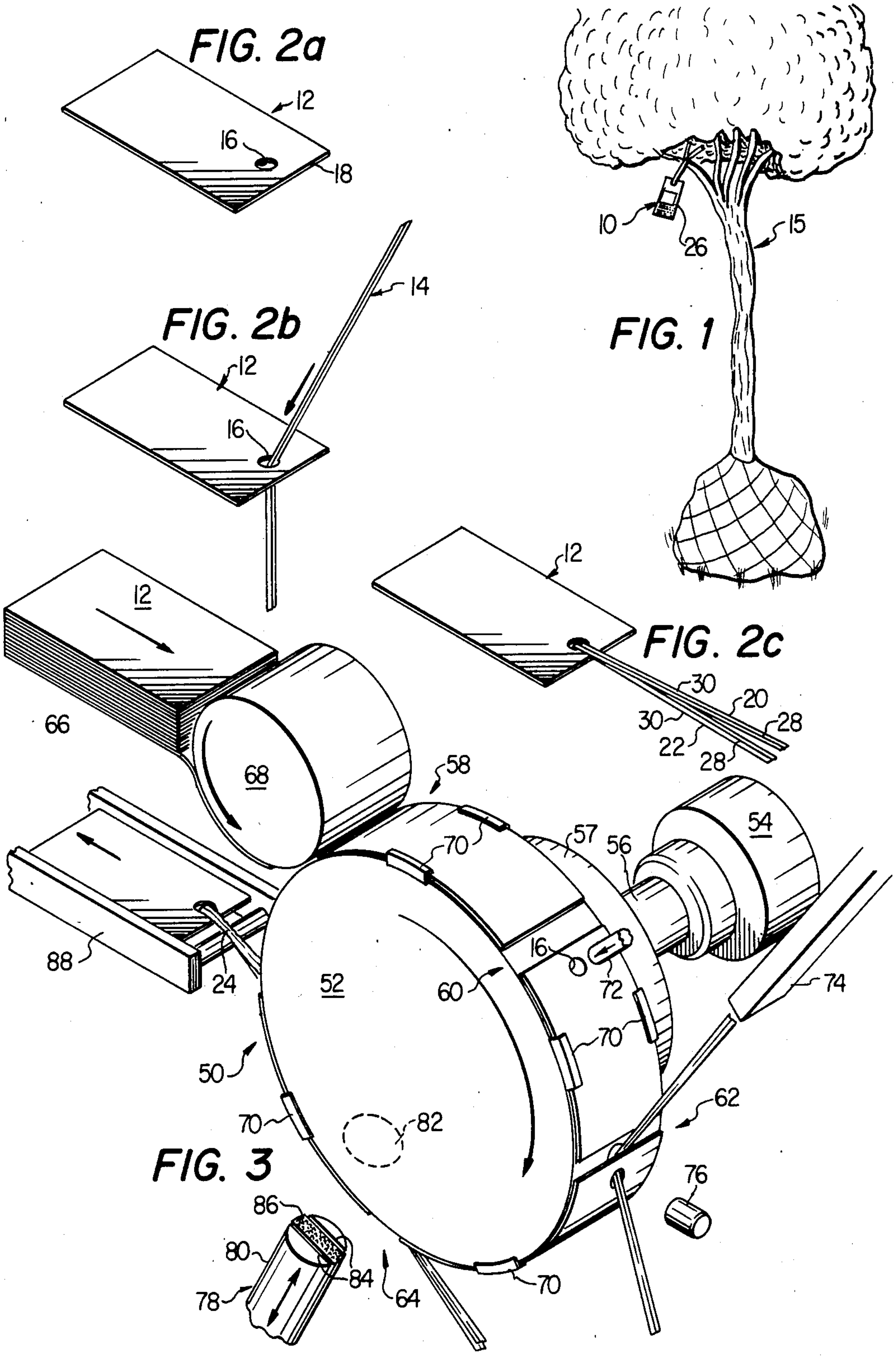
FIG. 1 is perspective view of a first embodiment of the plant tag of the present invention.
FIG. 2*a–c* illustrate the sequential stages in the formation of the plant tag.
FIG. 3 is a schematic view of the apparatus for making the plant tag.

Referring now to the Drawings, wherein like reference characters designate like or corresponding parts throughout several views, and in particular to FIGS. 1–3, a plant tag 10 forming a first embodiment of the present invention is illustrated. The plant tag 10 includes a tag card 12 and a tie 14 for securing the tag to a plant 15. The tie 14 is passed through a hole 16 formed in the tag card 12 near an edge 18 thereof and is doubled over to form parallel tie portions 20 and 22 which extend outward from the tag card 12. The tie portions 20 and 22 are ultrasonically welded together near edge 18 at weld 24 as best seen in FIG. 3 to prevent the tie and tag card from separating.

The tag card 12 is specifically adapted to carry indicia 26 as shown in FIG. 1. Indicia 26 can include the type of plant to which the tag 10 is attached, some general information about the plant and instructions for the planting and care of the plant. The tag card 12 can be formed of any suitable material on which indicia 26 can be printed and which is resistant, to an adequate degree, to environmental factors such as rain, heat and wind. In the preferred embodiment, the tag card 12 is formed of a polymeric material such as the material sold under the trademark Stacon. As can be seen, the tag card 12 has hole 16 formed therein, preferably by a sharpened punch. While hole 16 can be located anywhere in the tag, it is preferable that the hole be near one edge, such as edge 18, so that the tie 14 passing through the hole 16 will position the tag card 12 most conveniently on the plant for viewing.

The purpose of the tie 14 is to permit the tag 10 to be secured to a plant without injuring the plant. Therefore, the tie 14 can be made of any material which accomplishes this task. Preferably, the tie 14 is formed of one or more flexible wires 28 which are embedded in a resilient material 30. Material 30 is preferably a thermoplastic or thermosetting plastic material capable of being ultrasonically bonded or melted together. The two tie portions 20 and 22 can be wrapped about the plant together, or separately, with the flexible wire 28 deforming to hold the tie portions wrapped about the plant and thus, the plant tag 10 on the plant.

With reference now to FIGS. 2 and 3, an apparatus and method are disclosed for manufacturing the plant tag 10. With specific reference to FIG. 3, a machine 50 is illustrated schematically which has at its core an operating cylinder 52 acting to index a tag card 12 about various positions to form the final plant tag 10. The operating cylinder 52 is driven by a continuous rotating motor 54 with drive shaft 56 through a geneva mechanism 57. This geneva mechanism 57 is designed so that the motor 54 and drive shaft 56 rotate the operating cylinder 52 for an arc of 90° once every complete 360° revolution of the motor 54 and drive shaft 56. The operating cylinder 52 is thus motionless during three quarters of the time necessary for the motor 54 to rotate the drive shaft 56 one complete revolution.

The operating cylinder 52 is provided with four positions as seen in FIG. 3, including the indexing position 58, the punching position 60, the tie feeding position 62 and the ultrasonic welding position 64. A tag card 12 is fed by vacuum from a card magazine 66 onto a feeder drum 68. After rotating one half revolution from the point where the feeder drum 68 received the tag card, the card is transferred to the indexing position 58 of the operating cylinder 52. The tag card is held for further processing to the operating cylinder 52 by a series of spring loaded grippers 70. The feeder drum rotates while the operating cylinder 52 is stationary so that the rotation of the feeder drum 68 causes the tag card to slide underneath the spring loaded grippers.

After the tag card 12 is received at the indexing position 58, the geneva mechanism will rotate the operating cylinder 52 90° in a clockwise direction shown by the arrow as viewed in FIG. 3. This will position the tag card 12 in the punch position 60. A punch 72 is operated after the operating cylinder 52 has ceased motion to punch hole 16 in the tag card 12. In the preferred embodiment, the punch is vacuum operated with its operation controlled by a cam on the drive shaft 56.

The geneva mechanism will then cause the operating cylinder 52 to rotate another 90° to position the tag card at the tie feeding position 62. A tie feeding machine 74 is positioned to cut a tie 14 from a continuous roll of tie material and insert one end of the tie 14 through the hole 16 in the tag card 12. The machine 74 and operating cylinder 52 cause the tie to be bent double as it passes through the hole to form the two tie portions 20 and 22. In the preferred embodiment, the tie 14 is approximately 10" long and each tie portion is approximately 5" long. The tie feeding machine 74 is of a type well-known in the art and will not be described any further, other than to note that it is preferably a conventional device using a double roller with a groove. In the preferred embodiment, a photosensor 76 is provided to confirm that a tag card 12 has been positioned on the operating cylinder 52 at the tie feeding position 62. If the sensor does not indicate the presence of a tag card, the tie feeding machine 74 is deactivated to avoid the feeding of a tie when there is no tag to receive it.

With yet another 90° movement of the operating cylinder 52, the plant tag and loosely attached tie 14 in tie feeding position 62 are moved to the ultrasonic welding position 64. An ultrasonic welding machine 78 is positioned to extend a sonic welding head 80 to compress the tie portions 20 and 22 together between the welding head 80 and a backup head 82. High frequency vibrations are then generated within the machine 78 and directed through the sonic welding head 80 to ultrasonically weld the tie portions 20 and 22 together for a predetermined length along the tie portions proximate the edge 18. In one device constructed in accordance with the teachings of the present invention, an ultrasonic welding machine manufactured by the Dukane Corporation of 2900 Dukane Drive, St. Charles, Ill. 60174, was used. This machine was a heavy-duty ultrasonic welder operating at an energy level of 1600 watts and a frequency of 20 kilohertz. With specific reference to FIG. 3, the sonic welding head 80 can be seen to have a generally circular welding face with grooves 84 on either side of the point of contact to accept overflow from the material 30 being welded. The welding surface of the head 80 has a series of dimples 86 which increase the effectiveness of the weld. In the device constructed in accordance with the present invention, a head having a diameter of ½" was used which created a weld 24 of about ½" length along the parallel tie portions 20 and 22 proximate the edge 18.

As the operating cylinder 52 is again rotated, the finished plant tag 10 can be removed from the cylinder and placed on a delivery conveyor 88 for subsequent processing. It is anticipated that the operating cylinder 52 will be operated in a range of 30–80 cycles per minute, which should yield from 3600 to 9600 completed plant tags 10 per hour. The operating cylinder 52 can be made long enough to place multiple cards at each position, if desired, to increase production.

It can be readily seen that the plant tag 10 is readily formed of available materials. The use of two tie portions permits the tag to be tied at two places on a plant or doubly tied at a single location. The ultrasonic weld between the tie portions assures that the tie and tag card will remain together despite the harsh environment that such a plant tag may be used. The apparatus and method for constructing plant tag 10 can also be seen to be efficient and readily adaptable for mass production.

Although one embodiment of the present invention has been illustrated in the accompanying Drawings and described in the foregoing Detailed Description, it will be understood that the invention is not limited to the embodiment disclosed, but is capable of numerous rearrangements, modifications and substitutions of parts and elements without departing from the scope and spirit of the invention.

I claim:

1. A method of manufacturing a plant tag comprising the steps of:

providing a tag card to a rotating operating cylinder at a first position;

indexing the operating cylinder so that the tag card is moved to a second position;

punching a hole in the tag card proximate an edge of the tag card at the second position;

indexing the tag card to a third position by rotating the operating cylinder;

threading a tie part way through the hole in the tag card and folding the tie double proximate the hole at the third position to form parallel tie portions extending from the edge of the tag card;

indexing the tag card to a fourth position by rotating the operating cylinder;

ultrasonically bonding at the fourth position the tie portions together for a portion thereof extending from proximate the edge of the tag card away therefrom, the unbonded lengths of the tie portions remaining to tie the plant tag to a plant.

2. The method of claim 1 wherein the step of punching the hole in the tag card further comprises the step of moving a punch against the operating cylinder to punch the hole in the tag card and the step of ultrasonically bonding the tie portions further comprises the step of moving an ultrasonic welding head from a position spaced from the operating cylinder to a position against the operating cylinder with the portion to be welded compressed between the ultrasonic welding head and the operating cylinder.

* * * * *